United States Patent

Cederstrand et al.

[15] 3,648,162

[45] Mar. 7, 1972

[54] PARAMAGNETIC GAS PARTIAL PRESSURE MEASURER

[72] Inventors: Carl N. Cederstrand, Brea; Michael Dodson, Fullerton, both of Calif.

[73] Assignee: Beckman Instruments, Inc.

[22] Filed: Oct. 24, 1969

[21] Appl. No.: 869,236

[52] U.S. Cl. ............................................................324/36
[51] Int. Cl. ......................................................G01r 33/12
[58] Field of Search ..............................324/36; 73/23, 27.5

[56] References Cited

FOREIGN PATENTS OR APPLICATIONS

| 191,888 | 1/1967 | U.S.S.R. | 324/36 |
| 1,078,789 | 3/1960 | Germany | 73/27.5 |

Primary Examiner—Alfred E. Smith
Attorney—Robert J. Steinmeyer and William F. McDonald

[57] ABSTRACT

Apparatus for determining the partial pressure of a paramagnetic gas in a gas mixture, comprising: an elongated C-shaped magnet for generating a plane of high-magnetic flux density over a relatively large rectangular area, and a region of low-flux density at short distances from such plane; and a test body in the shape of a rectangular parallelepiped having dimensions approximately equal to the size of the rectangular area and the distance between the plane of high-flux density and the region of low-flux density. Means are provided for pivotally mounting the test body with one surface thereof aligned with the rectangular area and an opposite surface aligned with the region of low-flux density, the test body being mounted for movement in a direction perpendicular to the plane of high-magnetic flux density.

20 Claims, 7 Drawing Figures

Patented March 7, 1972

3,648,162

INVENTOR.
CARL N. CEDERSTRAND
MICHAEL DODSON
BY

ATTORNEY

PARAMAGNETIC GAS PARTIAL PRESSURE MEASURER

BACKGROUND OF THE INVENTION

1. Field of the Invention

The present invention relates generally to an instrument for measuring the partial pressure of a paramagnetic gas in a gas mixture and, more particularly, to a novel configuration for a paramagnetic gas sensor which significantly increases the sensitivity thereof.

2. Description of the Prior Art

Apparatus for measuring the partial pressure of a paramagnetic gas, such as oxygen, in a mixture of gases is old and well known. One such apparatus is based on the principle that the buoyant force acting on a test body in an inhomogeneous magnetic field is dependent on the magnetic susceptibility of the gas surrounding the test body. Since oxygen alone of the common environmental gases is highly paramagnetic while all other components are very slightly diamagnetic, a measurement of the buoyant force generated by a mixture of gasses provides a measurement of the partial pressure of oxygen in the gas mixture with very little error or need for correction because of the presence of the other gases.

Heretofore, all paramagnetic gas sensors based upon the principle of a magnetic balance have been of the type disclosed in U.S. Pat. No. 2,416,344 issued on Feb. 25, 1947 to Linus Pauling in which the test body is in the form of two spheres in a dumbbell configuration freely suspended on a fiber. The test body has then been placed in an inhomogeneous magnetic field (established, for example, by wedge-shaped pole pieces) and the buoyant force exerted on the test body measured.

With such a configuration, each sphere floats in a region of varying atmospheric pressure, experiencing a greater force on one side thereof than on the other. This change in pressure is due to the accumulation of the paramagnetic gas in the magnetic field. In other words, the paramagnetic gas in the gas mixture is attracted to the region of highest magnetic flux density which is positioned adjacent one side of each sphere. This accumulation of paramagnetic gas exerts an increased force on the one side of the sphere, the magnitude of which is a function of the quantity of the paramagnetic gas in the gas mixture. Finally, this force generates a torque which is measured to derive an indication of the partial pressure of the paramagnetic gas in the gas mixture.

The major problem with all paramagnetic gas sensors of this type is the low value of the force that must be measured. The force on a typical spherical test body is only on the order of one-millionth of atmospheric pressure (1 dyne) at 760 mm. of oxygen. On the other hand, the force on the test body is a direct function of the volume thereof and the configuration of the magnetic field. This being the case, it is essential that the relationship between the shape of the magnetic field and the shape of the test body maximizes the available force. However, the geometric relationship between the spherical ends of the dumbbell and the magnetic field has inevitably resulted in an incomplete utilization of the available magnetic field.

SUMMARY OF THE INVENTION

According to the present invention, there is provided an instrument for measuring the partial pressure of a paramagnetic gas in a gas mixture which substantially reduces these problems of the prior art. The present instrument incorporates an entirely new and different configuration for a means for generating an inhomogeneous magnetic field and an entirely new configuration for a test body which results in an essentially complete utilization of the magnetic field, thereby maximizing the measurable force and increasing the overall sensitivity of the instrument.

Briefly, the present invention includes an elongated, C-shaped magnet for generating a plane of high magnetic flux density over a relatively large rectangular area and a region of low flux density at short distances from such plane. The test body takes the shape of a long rectangular parallelepiped which extends the entire length of the gap in the magnet and fully occupies the volume between the plane of high flux density and the region of low flux density. Finally, means are provided for pivotally mounting the test body for movement in a direction perpendicular to the plane of high magnetic flux density whereby the torque exerted on the test body provides an indication of the partial pressure of the paramagnetic gas in the gas mixture surrounding the test body.

It is, therefore, an object of the present invention to provide a novel instrument for measuring the partial pressure of a paramagnetic gas in a gas mixture.

It is a further object of the present invention to provide an instrument for measuring the partial pressure of a paramagnetic gas in a gas mixture which has a much higher sensitivity than prior art gas sensors.

It is a still further object of the present invention to provide a novel configuration for paramagnetic gas sensor which includes means for generating a plane of high magnetic flux density over a relatively large rectangular area and a region of low flux density at short distances from such plane. It is another object of the present invention to provide such an instrument which further includes a test body which extends the entire length of the rectangular area and fully occupies the volume between the plane of high flux density and the region of low flux density.

Still other objects, features and attendant advantages of the present invention will become apparent to those skilled in the art from a reading of the following detailed description of the preferred embodiment constructed in accordance therewith, taken in conjunction with the accompanying drawings wherein like numerals designate like parts in the several figures and wherein:

DESCRIPTION OF THE PREFERRED EMBODIMENT

Figure 1B:
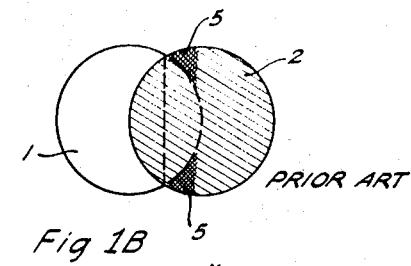
FIG. 1B is a view taken along the line 1—1 in FIG. 1A.
Figure 1A:
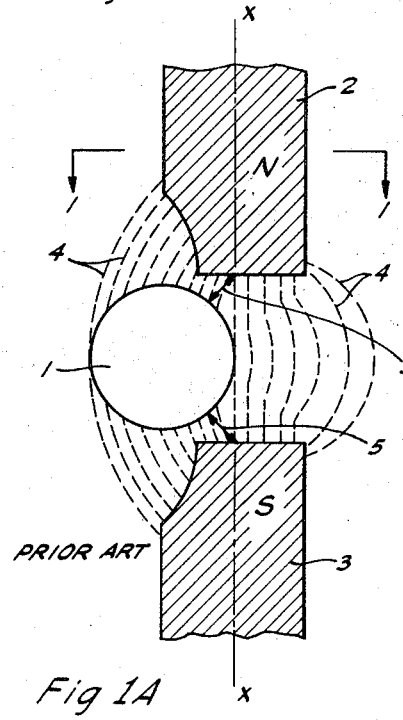
FIG. 1A is a diagrammatic view of a portion of a typical prior art paramagnetic gas sensor which utilizes a dumbbell in an inhomogeneous magnetic field.

Referring now to the drawings and, more particularly, to FIGS. 1A and 1B thereof, to this date, essentially all paramagnetic gas sensors based upon the principle of a magnetic balance have utilized a test body 1 in the form of two spheres in a dumbbell configuration mounted for rotation in an inhomogeneous magnetic field which is established, for example, by wedge-shaped pole pieces 2 and 3. With such a configuration, the region of highest magnetic flux density is along an axis $x$—$x$ and sphere 1 is positioned approximately tangent to such axis. The strength of the magnetic field decreases in a direction perpendicular to axis $x$—$x$. As a result, sphere 1 floats in a region of varying atmospheric pressure, experiencing a greater force on the side tangent to axis $x$—$x$ than on the opposite side. This increase in pressure is due to the accumulation of the paramagnetic gas in the magnetic field. In other words, the paramagnetic gas in the gas mixture is attracted to the region of highest magnetic flux density, namely axis $x$—$x$. This accumulation of paramagnetic gas tries to displace sphere 1 exerting a force on one side thereof, the magnitude of which is a function of the quantity of the paramagnetic gas in the gas mixture. This force generates a torque tending to rotate sphere 1, which rotation may be measured to derive an indication of the partial pressure of the paramagnetic gas in the gas mixture.

Two significant problems exist with a configuration as shown in FIGS. 1A and 1B. In the first instance, and as shown in FIG. 1A, a large amount of flux leakage, indicated at 4, occurs around the gap between pole pieces 2 and 3. Secondly, the geometric relationship between sphere 1 and the magnetic field inevitably results in large amounts of unused flux, indicated at 5, such that there is incomplete utilization of the magnetic field.

Figure 2A:
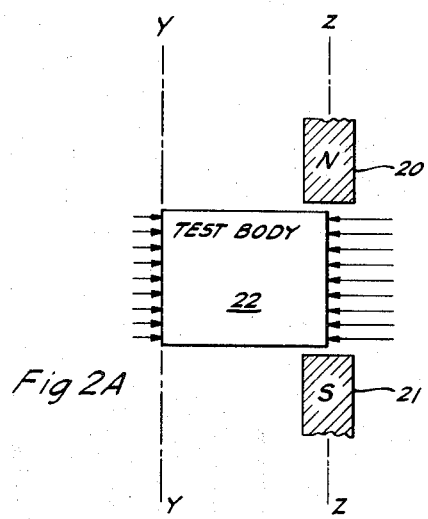
FIG. 2A is a diagrammatic view of a test body in a magnetic field which demonstrates the principles of the present invention.
Figure 2B:
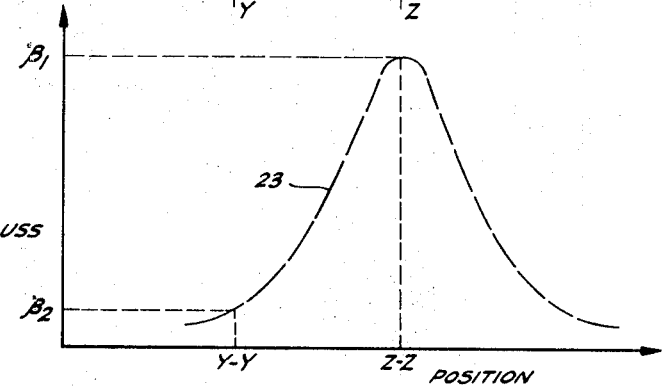
FIG. 2B is a graph showing the variation of the magnetic field with position for the configuration of FIG. 2A.

Referring now to FIGS. 2A and 2B, the present invention contemplates providing both a magnetic field and a test body which are completely different than instruments of the type shown in FIGS. 1A and 1B. The present magnetic field is provided by elongated, magnetic pole pieces 20 and 21, which generate a plane $z—z$ of high magnetic flux density $\beta_1$ over a relatively large rectangular area. A corresponding region of much lower flux density $\beta_2$ exists in the nearby vicinity in plane $y—y$. A high flux gradient connects the two regions. The curve 23 of FIG. 2B indicates the desired variation in flux density. In addition, the same flux density distribution should exist for a substantial distance in a direction perpendicular to the plane of FIG. 2A. Such a long magnetic gap minimizes the flux leakage at the ends thereof and, hence, provides more usable flux per pound of magnetic material.

The shape for a test body 22 capable of utilizing such a plane of high magnetic flux density must be such that test body 22 extends the entire length of the gap between pole pieces 20 and 21 and fully occupies the volume between the plane $z—z$ of high flux density and the plane $y—y$ of low flux density.

Figure 3:
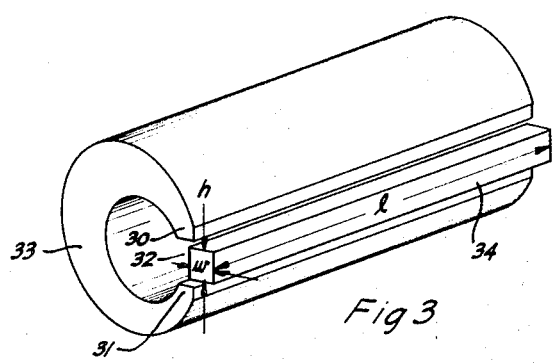
FIG. 3 is a perspective view of a magnet and test body constructed in accordance with the teachings of the present invention.

Referring now to FIG. 3, a magnetic field of the desired configuration can be generated by diametrically magnetizing two long bars 30 and 31 and then placing them parallel to one another to form a gap 32 across which a plane of high magnetic flux density will exist. A return path for the flux is provided so that a complete magnet 33 has the shape of a "C." With such a magnet, a magnetic field is obtained which provides the necessary high flux density in gap 32 with a large field gradient or rapid decrease in flux density at short distances from gap 32.

Since it is not practical to fully extend the test body into the region of very low flux density, a test body, generally designated 34, that utilizes the greatest portion of the magnetic flux takes the shape of a long rectangular parallelepiped having a height $h$ which is slightly less than the length of gap 32 in magnet 33, having a length $l$ which is equal to the length of magnet 33, and having a width $w$ which is great enough to cause test body 34 to extend from the plane of high flux density into the region of low flux density. With such a configuration, a buoyant force which is several orders of magnitude greater than that previously obtainable is possible.

Figure 4:
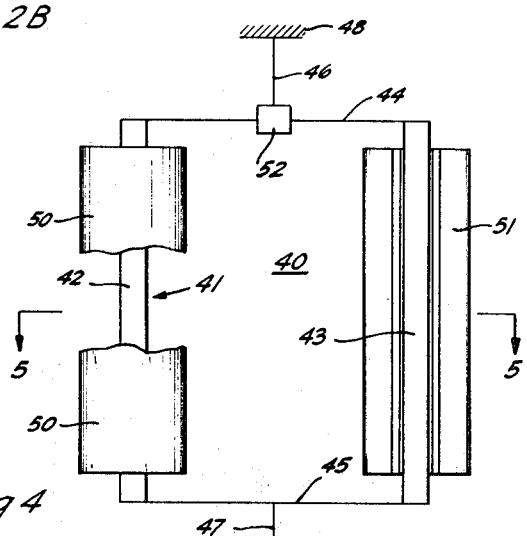
FIG. 4 is a front elevation view of a preferred embodiment of paramagnetic gas sensor constructed in accordance with the teachings of the present invention.
Figure 5:
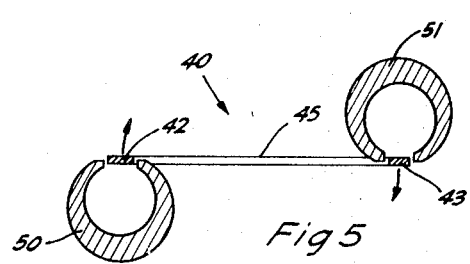
FIG. 5 is a view taken along the line 5—5 in FIG. 4.

Referring now to FIGS. 4 and 5, and by way of example only, a test body and magnet of the types shown in FIG. 3 may be formed into an instrument, generally designated 40, for measuring the partial pressure of a paramagnetic gas in a gas mixture. According to the embodiment of FIGS. 4 and 5, the test body, generally designated 41, is in the form of a rectangular frame, having first and second vertically disposed, nonmagnetic test elements 42 and 43, connected at their tops and bottoms by a pair of metal strips 44 and 45. As in FIG. 3, test elements 42 and 43 are in the shape of long, rectangular parallelepipeds. Test body 41 is suspended by connecting a pair of taut bands or fibers 46 and 47 between the middle of metal strips 44 and 45, respectively, and a fixed support 48, so that test body 41 is pivotably movable about a vertical axis defined by fibers 46 and 47.

As shown most clearly in FIG. 5, a plane of high magnetic flux density and a region of low magnetic flux density at short distances therefrom may be generated in the vicinity of test elements 42 and 43 by a pair of C-shaped magnets 50 and 51 which are supported in any convenient manner relative to test elements 42 and 43, so that one side of each of test elements 42 and 43 is aligned with the plane of high magnetic flux density in the gaps in magnets 50 and 51.

Furthermore, test body 41 may be mounted in any suitable housing which permits the test gas to pass therethrough and into the gaps in magnets 50 and 51. Finally, in order to detect the deflection of test elements 42 and 43 in response to the presence of a paramagnetic gas in such test gas, a mirror 52 may be fastened to metal strip 44 and centered with respect to fiber 46. Such mirror may operate to reflect a beam of light and thus indicate a change of position of test body 41 in a fashion similar to that described in the beforementioned U.S. Pat. No. 2,416,344.

Therefore, it can be seen that in accordance with the teachings of the present invention, there is provided an instrument for measuring the partial pressure of a paramagnetic gas in a gas mixture which substantially overcomes a significant problem which exists with prior art sensors. The present instrument incorporates a novel configuration of magnet for generating a plane of high magnetic flux density over a relatively large rectangular area and a region of low flux density at short distances from such plane. The present instrument further incorporates a novel test body which takes the shape of a long, rectangular parallelepiped which extends the entire length of a gap in the magnet and fully occupies the volume between the plane of high flux density and the region of low flux density. Such a configuration results in an essentially complete utilization of the magnetic field, thereby maximizing the measurable force and hence increasing the overall sensitivity of the instrument.

While the invention has been described with respect to a preferred physical embodiment constructed in accordance therewith, it will be apparent to those skilled in the art that various modifications and improvements may be made without departing from the scope and spirit of the invention.

We claim:

1. In an instrument for measuring the partial pressure of a paramagnetic gas in a gas mixture, apparatus comprising:
   means for generating a plane of high magnetic flux density over a relatively large rectangular area and a region of low flux density at short distances from said plane;
   a test body having dimensions approximately equal to the size of said rectangular area and said short distance between said plane of high flux density and said region of low flux density;
   means for pivotally mounting said test body for movement in a direction perpendicular to said plane; and wherein said test body comprises:
   a rectangular parallelepiped having a height and a length which are approximately equal to the dimensions of said rectangular area and having a width which is approximately equal to said distance between said plane and said region.

2. In an instrument according to claim 1, apparatus wherein said means for generating comprises:
   first and second diametrically magnetized, long bars positioned parallel to one another thereby forming a gap therebetween.

3. In an instrument for measuring the partial pressure of a paramagnetic gas in a gas mixture, apparatus comprising:
   means for generating a plane of high magnetic flux density over a relatively large rectangular area and a region of low flux density at short distances from said plane;
   a test body having dimensions approximately equal to the size of said rectangular area and said short distance between said plane of high flux density and said region of low flux density;
   means for pivotally mounting said test body for movement in a direction perpendicular to said plane;
   said means for generating comprising an elongated, C-shaped magnet, the opposite ends of said magnet being spaced apart and parallel thereby forming a gap across which said plane of high magnetic flux density is generated; and wherein said test body comprises a rectangular parallelepiped having a height which is slightly less than the length of said gap, having a length which is substantially equal to the length of said magnet, and having a width which is approximately equal to said distance between said plane and said region.

4. In an instrument according to claim 1, apparatus wherein said test body is nonmagnetic or only slightly magnetic.

5. An instrument for measuring the partial pressure of a paramagnetic gas in a gas mixture, comprising:
means for generating a plane of high magnetic flux density over first and second relatively large rectangular areas and regions of low flux density at short distances from said areas;
a test body comprising:
first and second test elements having dimensions approximately equal to the size of said rectangular areas and said short distances between said areas and said regions; and
means for pivotally mounting said test body with one surface of each of said first and second test elements coplanar with said first and second rectangular areas, respectively, and with an opposite surface of each of said first and second test elements in said regions of low flux density, said test elements being rotatable in a direction perpendicular to said planes.

6. An instrument according to claim 5, wherein said test elements comprise rectangular parallelepipeds and wherein said test body further comprises:
first and second thin, elongated strips connected at their ends to the ends of said test elements thereby forming a generally rectangular frame.

7. An instrument according to claim 6, wherein said means for pivotally mounting said test body comprises:
first and second fibers connected between the centers of said first and second strips, respectively, and a fixed support, said test elements being rotatable about an axis defined by said fibers.

8. An instrument according to claim 5 wherein said first and second test elements are nonmagnetic or only slightly magnetic.

9. An instrument according to claim 5 wherein said means for generating comprises:
first and second pairs of diametrically magnetized, long bars, the bars of each pair being positioned parallel to one another thereby forming gaps therebetween.

10. An instrument according to claim 5 wherein said means for generating comprises:
first and second elongated, C-shaped magnets, each of said magnets having a gap therein across which said planes of high magnetic flux density are generated.

11. An instrument according to claim 10 wherein each of said test elements comprises:
a rectangular parallelepiped having a height which is slightly less than the length of said gap, having a length which is substantially equal to the length of said magnets, and having a width which is approximately equal to said distance between said plane and said region.

12. An instrument according to claim 11 wherein said test body further comprises:
first and second thin, elongated strips connected at their ends to the ends of said test elements thereby forming a generally rectangular frame.

13. An instrument according to claim 12, wherein said means for pivotally mounting said test body comprises:
first and second fibers connected between the centers of said first and second strips, respectively, and a fixed support, said test elements being rotatable about an axis defined by said fibers.

14. In an instrument for measuring the partial pressure of a paramagnetic gas in a gas mixture, apparatus comprising:
means for generating a plane of high magnetic flux density over a relatively large rectangular area and a region of low flux density at short distances from said plane;
a test body which substantially fully occupies the volume between said rectangular area and said region of low flux density;
means for mounting said test body for movement in a direction perpendicular to said plane;
said means for generating comprising first and second diametrically magnetized, long bars positioned parallel to one another thereby forming a gap therebetween, said first and second bars being connected together to form a C-shaped magnet; and
said test body comprises a rectangular parallelepiped having a height which is slightly less than the length of said gap, having a length which is substantially equal to the length of said bars, and having a width which is approximately equal to said distance between said plane and said region.

15. In an instrument according to claim 14, apparatus wherein said test body is either nonmagnetic or very close to being nonmagnetic.

16. In an instrument for measuring the partial pressure of a paramagnetic gas in a gas mixture, apparatus comprising:
means for generating a plane of high magnetic flux density over a relatively large rectangular area and a region of low flux density at short distances from said plane;
a test body which substantially fully occupies the volume between said rectangular area and said region of low flux density;
means for mounting said test body for movement in a direction perpendicular to said plane;
means for generating a plane of high magnetic flux density over a second relatively large rectangular area and a second region of low flux density at short distances from said second area; and
a second test body which substantially fully occupies the volume between said second rectangular area and said second region of low flux density; and wherein said means for mounting said first-mentioned test body includes:
means for connecting said first and second test bodies, said second test body being mounted for movement in a direction perpendicular to said second rectangular area.

17. In an instrument according to claim 16, apparatus wherein said means for generating planes of high magnetic flux density over first and second rectangular areas comprises:
first and second elongated C-shaped magnets, each of said magnets having a gap therein across which said planes of high magnetic flux density are generated.

18. In an instrument according to claim 17, apparatus wherein each of said test bodies comprises:
a rectangular parallelepiped having a height which is slightly less than the length of said gaps, having a length which is substantially equal to the length of said magnets, and having a width which is approximately equal to said short distance between said planes and said regions.

19. In an instrument according to claim 18, apparatus wherein said means for connecting said test bodies comprises:
first and second thin, elongated strips connected at their ends to the ends of said test bodies thereby forming a generally rectangular frame.

20. In an instrument according to claim 19, apparatus wherein said means for mounting said test body comprises:
first and second fibers connected between the centers of said first and second strips, respectively, and a fixed support, said test bodies being rotatable about an axis defined by said fibers.

* * * * *